United States Patent
Sudo

(10) Patent No.: US 7,639,281 B2
(45) Date of Patent: Dec. 29, 2009

(54) IMAGE SENSING APPARATUS AND CONTROL METHOD THEREFOR

(75) Inventor: Koji Sudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 768 days.

(21) Appl. No.: 10/952,919

(22) Filed: Sep. 30, 2004

(65) Prior Publication Data
US 2005/0078199 A1 Apr. 14, 2005

(30) Foreign Application Priority Data
Oct. 6, 2003 (JP) .............................. 2003-346961

(51) Int. Cl.
 H04N 5/228 (2006.01)
 H04N 5/225 (2006.01)
 G03B 17/00 (2006.01)
 G03B 7/087 (2006.01)

(52) U.S. Cl. .............. 348/222.1; 348/220.1; 348/221.1; 396/57; 396/168

(58) Field of Classification Search ............ 348/207.99, 348/222.1, 231.99, 296, 223.1, 224.1, 229.1, 348/362, 220.1, 221.1, 208.1; 396/61, 63, 396/64, 65, 85, 86, 57, 137, 168
See application file for complete search history.

(56) References Cited

U.S. PATENT DOCUMENTS

| | | | | |
|---|---|---|---|---|
| 4,525,054 A | * | 6/1985 | Someya et al. .............. 396/243 |
| 4,816,856 A | * | 3/1989 | Hamada et al. ................ 396/95 |
| 5,283,606 A | * | 2/1994 | Konno et al. ................. 396/299 |
| 5,319,412 A | * | 6/1994 | Hamada et al. ................ 396/95 |
| 5,749,005 A | * | 5/1998 | Haga et al. ................... 396/287 |
| 6,567,123 B1 | * | 5/2003 | Hashimoto ............... 348/229.1 |
| 6,701,075 B2 | * | 3/2004 | Ogino ........................ 396/101 |
| 6,710,808 B1 | * | 3/2004 | Yamagishi .................. 348/362 |
| 6,965,410 B1 | * | 11/2005 | Yamagishi .................. 348/362 |
| 7,221,391 B2 | * | 5/2007 | Yamagishi ............... 348/222.1 |
| 7,330,206 B2 | * | 2/2008 | Nishimura ............... 348/223.1 |
| 7,443,425 B2 | * | 10/2008 | Ogawa ..................... 348/221.1 |
| 2001/0030694 A1 | * | 10/2001 | Abe ........................... 348/223 |
| 2003/0202115 A1 | * | 10/2003 | Sugimoto et al. ........... 348/362 |
| 2006/0072032 A1 | * | 4/2006 | Kaneda ...................... 348/362 |
| 2006/0221223 A1 | * | 10/2006 | Terada ................... 348/333.05 |
| 2007/0268397 A1 | * | 11/2007 | Udono ....................... 348/362 |

FOREIGN PATENT DOCUMENTS

JP 6-265987 9/1994

* cited by examiner

*Primary Examiner*—Tuan Ho
*Assistant Examiner*—Marly Camargo
(74) *Attorney, Agent, or Firm*—Fitzpatrick, Cella, Harper & Scinto

(57) ABSTRACT

In an image sensing apparatus such as a digital camera, digital video camera, or the like, if a photography mode which requires photography with priority on precision is selected, photography is executed in accordance with precision priority setting even when the photography setting is so made as to put a higher priority on speed. This makes it possible to prevent the user's intention from disagreeing with setting as to whether a higher priority is put on speed or precision in photography.

3 Claims, 7 Drawing Sheets

IMAGE SENSING APPARATUS AND CONTROL METHOD THEREFOR

FIELD OF THE INVENTION

The present invention relates to an image sensing apparatus which photographs still images or moving images and a control method therefor.

BACKGROUND OF THE INVENTION

Conventionally, there is commercially available an image sensing apparatus such as an electronic camera which records, plays back, and communicates still images or moving images using a memory card with a memory device as a recording medium. Such an apparatus reads out a charge signal from an image sensing element, A/D converts the signal, and executes image processing, thereby implementing distance measurement/photometry processing.

Instantaneity (strong in grabbing shutter chances, i.e., ready for photography whenever the user wants) and high quality photographed images (high exposure accuracy and focusing accuracy) are generally demanded for photography.

In a conventional image sensing apparatus, when the shutter is to be depressed (fully pressed) in photography, AF exposure control, AF control, exposure control, white balance control, and the like are executed after the shutter is pressed halfway. Then, the shutter is opened to execute photography. This causes a release time lag and causes a problem with instantaneity in photography.

A pre-emission operation in red-eye-effect relaxation processing is also known to impair the instantaneity. For example, Japanese Patent Laid Open No. 6 265987 proposes a camera which executes red-eye-effect relaxation processing in normal photography and skips red-eye-effect relaxation processing if the shutter depression speed is higher than a predetermined value.

There is also proposed a method of simplifying an arithmetic operation to increase the instantaneity and an image sensing apparatus in which the user can selectively set a speed (instantaneity) priority photography mode and a precision priority photography mode. This apparatus is manually set, and is not always set to a photography mode which meets the photography needs when the user actually executes photography. For this reason, in some cases, the user's intention does not coincide with the set photography mode. The mode needs to be confirmed before each photography operation, and this is cumbersome.

SUMMARY OF THE INVENTION

The present invention has been made in consideration of the conventional drawbacks, and has as its main object to provide an image sensing apparatus which can execute photography in an appropriate photography mode without making the user become conscious and a control method therefor.

According to the present invention, the foregoing object is attained by providing an image sensing apparatus which can select one of a first processing mode of executing speed priority photography processing and a second processing mode of executing precision priority photography processing, comprising:

first determination means for determining a set one out of a plurality of photography modes;

second determination means for determining whether the first processing mode or second processing mode is set;

storage means for storing a photography mode which requires photography using the second processing mode; and photography means for executing photography processing on the basis of the set processing mode and the photography mode, wherein the photography means executes the photography processing while assuming that the second processing mode is set, if the first processing mode is set, and an instruction is given to execute photography in the photography mode which requires photography using the second processing mode.

According to another aspect of the present invention, the foregoing object is attained by providing, an image sensing apparatus which can select one of a first processing mode of executing speed priority photography processing and a second processing mode of executing precision priority photography processing, comprising:

photography mode setting means for setting one out of a plurality of photography modes;

second determination means for determining whether the first processing mode or second processing mode is set;

storage means for storing a photography mode which requires photography using the second processing mode; and setting inhibition means for inhibiting the photography mode setting means from setting the photography mode which requires photography using the second processing mode.

According to still another aspect of the present invention, the foregoing object is attained by providing, an image sensing apparatus which can select one of a first processing mode of executing speed priority photography processing and a second processing mode of executing precision priority photography processing, comprising:

first determination means for determining a set one out of a plurality of photography modes;

second determination means for determining whether the first processing mode or second processing mode is set;

storage means for storing a photography mode which requires photography using the first processing mode; and photography means for executing photography processing on the basis of the set processing mode and the photography mode, wherein the photography means executes the photography processing while assuming that the first processing mode is set, if the second processing mode is set, and an instruction is given to execute photography in the photography mode which requires photography using the first processing mode.

According to still another aspect of the present invention, the foregoing object is attained by providing, an image sensing apparatus which can select one of a first processing mode of executing speed priority photography processing and a second processing mode of executing precision priority photography processing, comprising:

photography mode setting means for setting one out of a plurality of photography modes;

second determination means for determining whether the first processing mode or second processing mode is set;

storage means for storing a photography mode which requires photography using the first processing mode; and setting inhibition means for inhibiting the photography mode setting means from setting the photography mode which requires photography using the first processing mode.

According to still another aspect of the present invention, the foregoing object is attained by providing, a control method for an image sensing apparatus which can select one of a first processing mode of executing speed priority photography processing and a second processing mode of executing precision priority photography processing, comprising:

a first determination step of determining a set one out of a plurality of photography modes;

a second determination step of determining whether the first processing mode or second processing mode is set; and a photography step of executing photography processing on the basis of the set processing mode and the photography mode, wherein in the photography step, the photography processing is executed while assuming that the second processing mode is set, if the first processing mode is set, and an instruction is given to execute photography in the photography mode which requires photography using the second processing mode.

According to still another aspect of the present invention, the foregoing object is attained by providing, a control method for an image sensing apparatus which can select one of a first processing mode of executing speed priority photography processing and a second processing mode of executing precision priority photography processing, comprising:

a photography mode setting step of setting one out of a plurality of photography modes;

a second determination step of determining whether the first processing mode or second processing mode is set; and a setting inhibition step of inhibiting setting of a predetermined photography mode which requires photography using the second processing mode in the photography mode setting step.

According to still another aspect of the present invention, the foregoing object is attained by providing, a control method for an image sensing apparatus which can select one of a first processing mode of executing speed priority photography processing and a second processing mode of executing precision priority photography processing, comprising:

a first determination step of determining a set one out of a plurality of photography modes;

a second determination step of determining whether the first processing mode or second processing mode is set; and a photography step of executing photography processing on the basis of the set processing mode and the photography mode, wherein in the photography step, the photography processing is executed while assuming that the first processing mode is set, if the second processing mode is set, and an instruction is given to execute photography in a predetermined photography mode which requires photography using the first processing mode.

According to still another aspect of the present invention, the foregoing object is attained by providing, a control method for an image sensing apparatus which can select one of a first processing mode of executing speed priority photography processing and a second processing mode of executing precision priority photography processing, comprising:

a photography mode setting step of setting one out of a plurality of photography modes;

a second determination step of determining whether the first processing mode or second processing mode is set; and a setting inhibition step of inhibiting setting of a predetermined photography mode which requires photography using the first processing mode in the photography mode setting step.

Other objects and advantageous besides those discussed above shall be apparent to those skilled in the art from the description of a preferred embodiment of the invention which follows. In the following description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Arrangement of Image Sensing Apparatus

Figure 1:
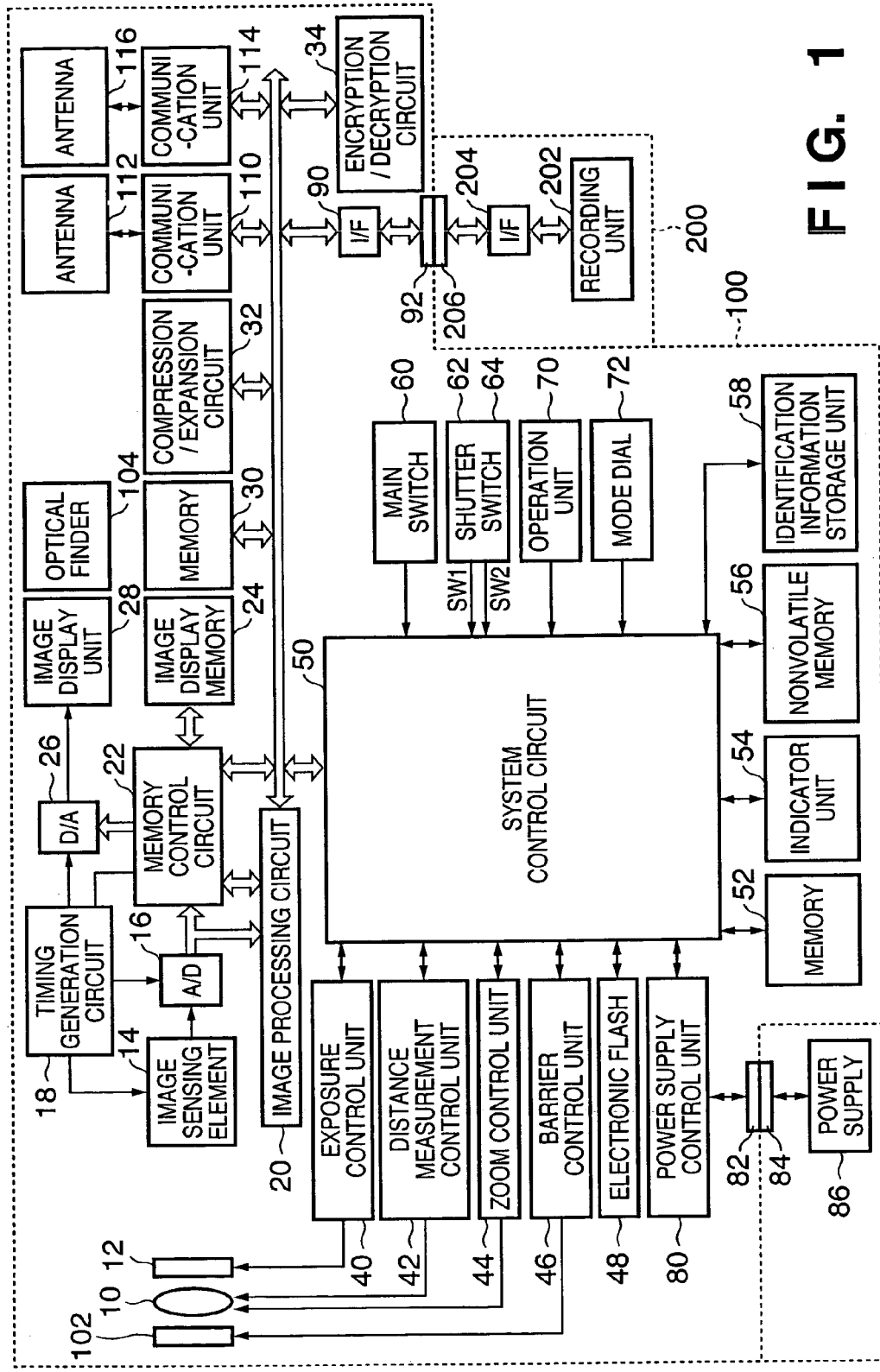
FIG. 1 is a block diagram showing an example of the arrangement of an image sensing apparatus according to an embodiment of the present invention.

FIG. 1 is a block diagram showing an example of the overall arrangement of an image sensing apparatus 100 according to this embodiment.

Reference numeral 10 denotes a photographic lens; reference numeral 12 denotes a shutter having a stop function; reference numeral 14 denotes an image sensing element such as a CCD, a CMOS sensor, or the like, which converts an optical image into an electrical signal; and reference numeral 16 denotes an A/D converter which converts an analog signal output from the image sensing element 14 into a digital signal.

A timing generation circuit 18 supplies a clock signal or control signal to the image sensing element 14, the A/D converter 16, and a D/A converter 26. The timing generation circuit 18 is controlled by a memory control circuit 22 and a system control circuit 50.

An image processing circuit 20 executes predetermined pixel interpolation processing or color conversion processing for data from the A/D converter 16 or data from the memory control circuit 22.

The image processing circuit 20 also executes predetermined arithmetic processing by using sensed image data. On the basis of the obtained arithmetic result, the system control circuit 50 controls an exposure control unit 40 and a distance measurement control unit 42. More specifically, the system control circuit 50 executes AF (Auto Focus) processing, AE (Auto Exposure) processing, and EF (Electronic Flash pre emission) processing of TTL (Through The Lens) scheme.

The image processing circuit 20 also executes predetermined arithmetic processing by using the sensed image data and executes AWB (Auto White Balance) processing of TTL scheme on the basis of the obtained arithmetic result.

The memory control circuit 22 controls the A/D converter 16, the timing generation circuit 18, the image processing circuit 20, an image display memory 24, the D/A converter 26, a memory 30, and a compression/expansion circuit 32.

Data from the A/D converter 16 is written in the image display memory 24 or memory 30 through the image processing circuit 20 and the memory control circuit 22, or directly through the memory control circuit 22.

Display image data written in the image display memory 24 is displayed through the D/A converter 26 on an image display unit 28 such as an LCD, an organic EL display, or the like. When sensed image data is sequentially displayed using the image display unit 28, an electronic finder function can be implemented.

The image display unit 28 can arbitrarily turn on/off display in accordance with an instruction from the system control circuit 50. When the display is turned off, power consumption of the image processing apparatus 100 can largely be reduced.

The memory 30 stores a photographed still image or a moving image. The memory 30 has a storage capacity large enough to store a predetermined number of still images or a moving image for a predetermined time. Accordingly, even in panoramic photography or continuous shooting for continuously taking a plurality of still images, a large quantity of images can quickly be written in the memory 30.

The memory 30 can also be used as a work area of the system control circuit 50.

The compression/expansion circuit 32 loads an image stored in the memory 30, executes known data compression/expansion processing by, e.g., Adaptive Discrete Cosine Transform (ADCT) or wavelet transform, and writes the processed data in the memory 30.

An encryption/decryption circuit 34 executes encryption processing for photographed image data stored in a predetermined area of the memory 30 as needed. The encryption/decryption circuit 34 also executes decryption processing in reconstructing and displaying the encrypted image data stored in the predetermined area of the memory 30.

Encrypted image data can also be decrypted by an encryption/decryption unit of an image information management apparatus (image gateway) (not shown) which can communicate through antennas 112 and 116. This encryption/decryption processing operation is executed in association with charging database information of a charging management unit of the image information management apparatus (image gateway).

The exposure control unit 40 controls the shutter 12 having a stop function. The exposure control unit 40 also has a flash brightness control function in cooperation with an electronic flash 48.

The distance measurement control unit 42 controls focusing of the photographic lens 10. A zoom control unit 44 controls zooming of the photographic lens 10. A barrier control unit 46 controls the operation of a protection unit 102 serving as a lens barrier for protecting the photographic lens 10.

The electronic flash 48 serves as an auxiliary light source in photography and has a light control function. The electronic flash 48 also has an AF auxiliary light projecting function.

The exposure control unit 40 and distance measurement control unit 42 are controlled by the TTL scheme. On the basis of an arithmetic result obtained from the image processing circuit 20 by processing sensed image data, the system control circuit 50 controls the exposure control unit 40 and the distance measurement control unit 42.

The system control circuit 50 (e.g., a CPU) controls the entire image processing apparatus 100 by executing a program stored in a memory 52 or a nonvolatile memory 56. The memory 52 stores constants, variables, and programs for the operations of the system control circuit 50.

An indicator unit 54 includes a combination of output devices such as an LCD, an LED, a speaker, and the like. The indicator unit 54 outputs the operation state or a message by using characters, images, or sound in accordance with the execution of a program by the system control circuit 50. One or a plurality of indicator units 54 are arranged at visible positions near an operation unit 70 of the image processing apparatus 100. Part of the indicator unit 54 is arranged in an optical finder 104.

The indication contents of the indicator unit 54 include the single shot/continuous shooting mode, a self timer, the compression ratio, the number of recording pixels, the number of recorded images, the number of recordable images, the shutter speed, the F number, exposure compensation, the electronic flash, red eye effect relaxation, macro photography, the buzzer setting, the timer battery level, the battery level, an error, information represented by a plurality of digits, the attached state of a recording medium 200, the operation of a communication I/F, the date/time, the connection state to an external computer, the in focus state, the completion of photographing preparation, a camera shake warning, the electronic flash charge, the completion of charging the electronic flash, the write operation of a recording medium, a macro photography setting notification, and the charging state of a secondary battery. Some of the indication contents are displayed in an optical finder 104.

Of the indication contents of the indicator unit 54, an example of indication on a light emitting device such as an LED is a self timer notification. A self timer notification lamp can also be used as an auxiliary AF light source.

The nonvolatile memory 56 is an electrically erasable/programmable memory. For example, an EEPROM or a flash memory is used as the nonvolatile memory 56. Various set values, programs executed by the system control circuit 50, data, and the like are stored in the nonvolatile memory 56. The types and conditions of photography modes which require photography with priority on precision are stored in the nonvolatile memory 56 in advance or as a result of setting by the user.

An identification information storage unit 58 stores pieces of identification information. One of them is used to perform authentication when communicating with the image information management apparatus (image gateway) (not shown) through a communication network such as a packet network by the communication units 110 and 114 and the antennas 112 and 116. Others are various pieces of identification information used to perform charging management when storing/retrieving photographed image data.

These pieces of identification information are used to update a charging information database when the image information management apparatus (image gateway) (not shown) provides various services to the image sensing apparatus 100.

A main switch 60, shutter switches 62 and 64, an operation unit 70, and a mode dial 72 comprise operation means for inputting various kinds of operation instructions of the system control circuit 50. They include single devices such as a button, a switch, a dial, a touch panel, or pointing by detection of a line of sight, and voice recognition device, or a combination of a plurality of devices.

These operation means will be described here in detail.

The power switch (main switch) 60 can selectively set modes, such as the power on mode and the power off mode of the image sensing apparatus 100. The power switch 60 can also selectively set modes, such as the power on mode and the power off mode of various attachments connected to the image sensing apparatus 100.

The shutter switch SW1 (62) is turned on midway during the operation of a shutter button (not shown) (pressed halfway) and instructs the start of an operation such as AF (Auto Focus) processing, AE (Auto Exposure) processing, AWB (Auto White Balance) processing, or EF (Electronic Flash pre emission) processing.

The shutter switch SW2 (64) is turned on at the end of the operation of a shutter button (not shown) (pressed fully) and instructs the start of a series of processing operations including exposure processing for writing image data read from the image sensing element 14 in the memory 30 through the A/D converter 16 and the memory control circuit 22, development processing using arithmetic processing by the image processing circuit 20 or the memory control circuit 22, and recording processing for reading out the image data from the memory 30, causing the compression/expansion circuit 32 to compress the image data, and writing it in the recording medium 200.

The operation unit 70 includes various kinds of buttons and a touch panel. The operation unit 70 has a menu button, a set button, a macro button, a multiwindow playback page break button, a flash set button, a single shot/continuous shot/self timer switching button, a menu move +(plus) button, a menu move –(minus) button, a playback image move +(plus) button, a playback image move –(minus) button, a photographed image quality selection button, a exposure compensation button, a date/time setting button, a image display ON/OFF button, a compression mode switch, a quick review switch used to set a quick review function of automatically playing back photographed image data immediately after photography, a selection/changeover switch used to selectively set various functions in executing photography, playback, or communication, a determination/execution switch used to determine and execute various functions in executing photography, playback, or communication, and the like.

The compression mode switch is used to select the compression ratio of JPEG (Joint Photographic Experts Group) compression or select a RAW mode for directly converting a signal output from the image sensing element into a digital signal and recording the digital signal on a recording medium.

In this embodiment, a normal mode and a fine mode are prepared as JPEG compression modes. When the user of the image processing apparatus 100 attaches importance to the data size of a photographed image, he/she can select the normal mode and photograph an object. When the user attaches importance to the image quality of a photographed image, he/she can select the fine mode and photograph an object.

In the JPEG compression mode, image data, which is read out from the image sensing element 14 and is written in the memory 30 through the A/D converter 16, image processing circuit 20, and memory control circuit 22, is read out, and is compressed at the selected compression ratio by the compression/expansion circuit 32. After that, the compressed image data undergoes predetermined encryption processing in the encryption/decryption circuit 34 as needed, and is recorded on the recording medium 200.

In the CCDRAW mode, image data, which is directly read out for each line in correspondence with the pixel formats of color filters of the image sensing element 14, and is written in the memory 30 through the A/D converter 16 and a memory control circuit 22, is read out. After the image data undergoes the predetermined encryption processing in the encryption/decryption circuit 34, it is recorded on the recording medium 200.

The mode dial switch 72 comprises, e.g., a photography/playback mode switching lever, a speed priority/normal distance measurement and photometry mode switching lever, and various photography mode (automatic mode, stitch photography mode (composite image photography mode), and moving image photography mode) switching dials.

A power supply control unit 80 comprises a battery detection circuit, a DC/DC converter, a switch circuit which selects a block to be energized, and the like. The power supply control unit 80 detects the presence/absence of a battery, the battery type, and the battery level, controls the DC/DC converter on the basis of the detection result and an instruction from the system control circuit 50, and supplies a necessary voltage to the units including a recording medium for a necessary period.

A power supply unit 86 comprises a primary battery such as an alkaline battery or a lithium battery, a secondary battery such as an NiCd battery, an NiMH battery, or a Li battery, or an AC adapter. The power supply is connected to the image sensing apparatus 100 by connectors 82 and 84.

Reference numeral 90 denotes an interface to a recording medium such as a memory card or hard disk; and reference numeral 92 denotes a connector connected to the recording medium 200, such as a memory card or hard disk.

The barrier 102 prevents any dirt or damage to the image sensing unit by covering the image sensing unit including the lens 10 of the image processing apparatus 100.

The optical finder 104 is, e.g., a TTL finder and causes a light beam having passed through the lens 10 using a prism and mirror to form an image. The use of the optical finder 104 makes it possible to perform photography without using the electronic finder function by the image display unit 28. The optical finder 104 incorporates some functions of the indicator unit 54, including, e.g., in focus indication, a camera shake warning indication, an electronic flash charge indication, a shutter speed indication, an F number indication, and an exposure compensation indication.

For example, the communication unit 110 has a mobile wireless communication function such as TDMA (Time Division Multiple Access), CDMA (Code Division Multiple Access), W CDMA (Wideband Code Division Multiple Access), or PHS (Personal Handyphone System). When the image sensing apparatus is wired to an external network, the communication unit provides a communication function according to a protocol for a wired connection.

The communication unit 110 connects the image sensing apparatus 100 to the image information management apparatus (image gateway) (not shown) or another device through a packet network (not shown) or network, using the antenna (or a connector connected to a communication cable) 112.

The other communication unit 114 has a wireless communication function such as Bluetooth.

The communication unit 114 may have various communication functions, i.e., wired communications such as RS232C, USB (Universal Serial Bus), IEEE (Institute of Electrical and Electronics Engineers) 1394, P1284, SCSI (Small Computer System Interface), modem, and LAN (Local Area Network), infrared communications such as IRDA (Infrared Data Association), optical communication, and the like.

The component 116 serves as an antenna when the image sensing apparatus 100 is connected to another device such as a printing apparatus (print service) (not shown) through the communication unit 114. The component 116 serves as a connector for a wire connection.

The recording medium 200 includes a memory card or a hard disk.

The recording medium 200 comprises a recording unit 202 including a semiconductor memory or magnetic disk, an interface 204 to the image processing apparatus 100, and a connector 206 connected to the image processing apparatus 100. Note that in this embodiment, the recording medium 200 is incorporated in the image sensing apparatus 100.

<Description of Operation of Image Sensing Apparatus 100>

The operation of the image sensing apparatus 100 will be described with reference to FIGS. 2 to 7.

Figure 2:
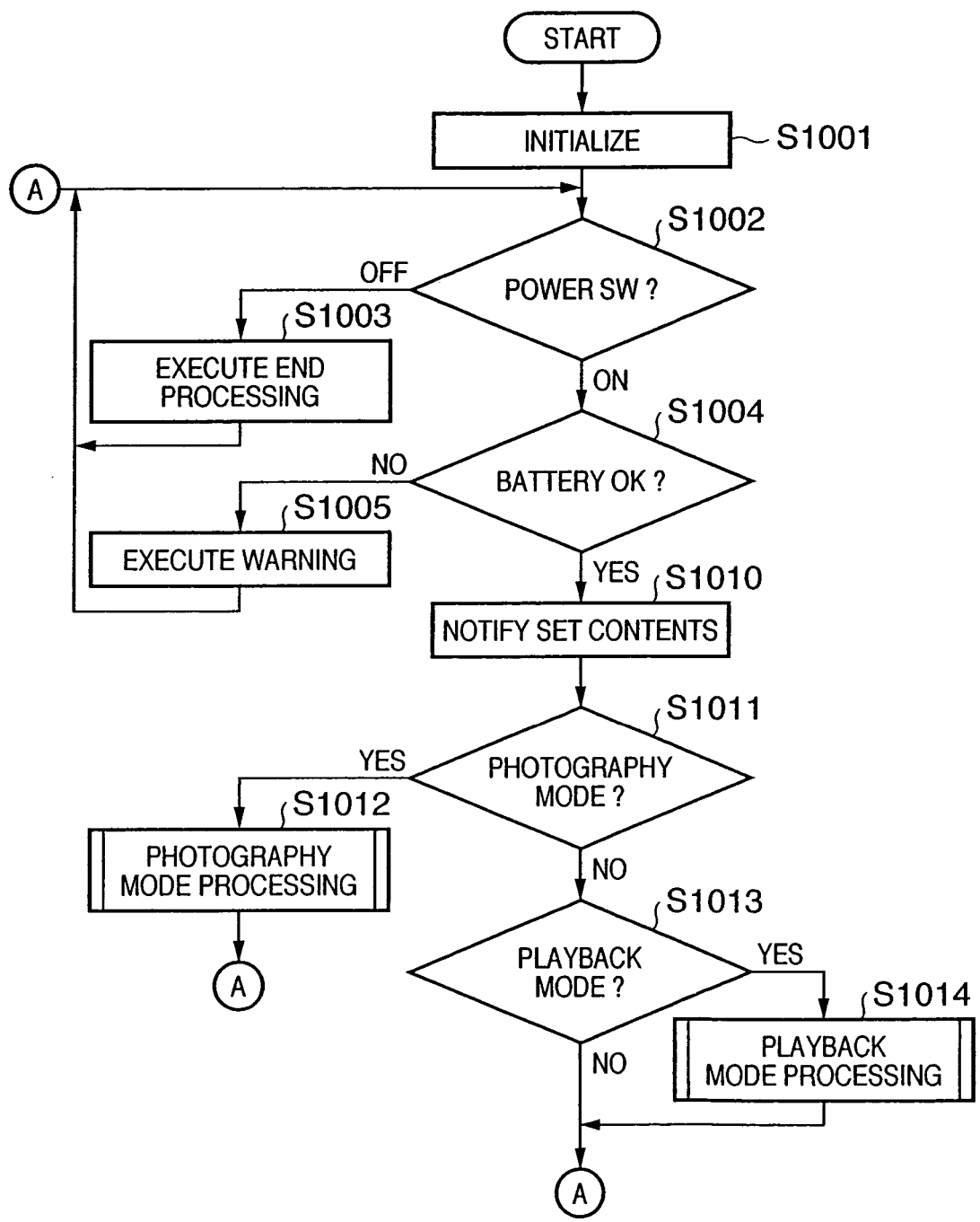
FIG. 2 is a flowchart for explaining the overall processing of the image sensing apparatus according to the embodiment of the present invention.

FIG. 2 is a flowchart of the overall operation of the image sensing apparatus 100.

When the apparatus is powered on, e.g., after battery change, the system control circuit 50 initializes flags and control variables and initializes the respective units of the image sensing apparatus 100 (step S1001).

The system control circuit 50 determines the set position of the mode dial 60 (step S1002). When the power switch 60 is set to the power off state, the display states of display units are changed to the end state. Necessary parameters, set values, and set modes, including flags and control variables, are recorded in the nonvolatile memory 56. After the power supply control unit 80 executes predetermined end processing (step S1003) such as a cutoff of unnecessary power of the units of the image sensing apparatus 100, including the image display unit 28, the flow returns to step S1002.

If it is determined in step S1002 that the power switch 60 is set to the power on state, the flow advances to step S1004. In step S1004, the system control circuit 50 causes the power supply control unit 80 to determine whether the level or operation situation of the power supply 86 including a battery or the like has a problem for the operation of the image sensing apparatus 100. If YES in step S1004, the indicator unit 54 or the image display unit 28 executes a predetermined warning indication by an image or sound (step S1005), and the flow returns to step S1002.

If NO in step S1004, the flow advances to step S1010. In step S1010, the system control circuit 50 causes the indicator unit 54 to indicate various set states of the image sensing apparatus 100 by an image or sound. If image display of the image display unit 28 is ON, various set states of the image sensing apparatus 100 are indicated by an image or sound by using even the image display unit 28.

The system control circuit 50 determines the set position of the mode dial 72 (step S1011). If the mode dial 72 is not set to a photography mode, the flow advances to step S1013.

If the mode dial 72 is set to the photography mode, the system control circuit 50 executes photography mode processing (step S1012). After the end of the processing, the flow returns to step S1002. The details of the photography mode processing (step S1012) will be described later with reference to FIG. 3.

In step S1013, the system control circuit 50 determines the set position of the mode dial 72. If the mode dial 72 is not set to a playback mode, the flow advances to step S1015. In step S1015, the system control circuit 50 executes processing of a mode to which the mode dial 72 is set, as needed, and the flow returns to step S1002.

On the other hand, if the mode dial 72 is set to the playback mode, the system control circuit 50 executes playback mode processing to display image data (e.g., a thumbnail image) schematically showing photographed image data (step S1014), and the flow returns to step S1002.

<Photography Mode Processing>

The photography mode processing executed in step S1012 of FIG. 2 will be described in detail with reference to the flowchart shown in FIG. 3.

The system control circuit 50 checks whether the user has changed various settings that pertain to photography (step S1101) through a manipulation of a switch or the like of the operation unit 70. If YES in step S1101, the operation settings that pertain to photography are changed in accordance with the changes (step S1102).

In step S1103, if the shutter switch SW1 (62) is not ON, the system control circuit 50 ends the photography mode processing.

On the other hand, if the shutter switch SW1 (62) is ON, the system control circuit 50 sets the focal length of the photographic lens 10 on an object by executing distance measurement processing and also decides the F number and shutter speed by executing photometry processing (step S1104). In the photometry processing, the electronic flash setting is also made as needed. The details of the distance measurement/photometry processing (step S1104) will be described later with reference to FIG. 4.

After that, it is checked in step S1105 whether the shutter switch SW2 (64) is ON. If NO in step S1105, the flow advances to step S1106 to check in the same manner as in step S1103 whether the shutter switch SW1 (62) is ON. Assume that the shutter switch SW1 (62) is turned off when the shutter switch SW2 (64) is not ON. In this case, the photography mode processing ends. If the shutter switch SW1 (62) is kept on in step S106, the flow returns to step S1105.

If the shutter switch SW2 (64) is turned on in step S1105, the system control circuit 50 executes photography processing (step S1107). The photography processing includes exposure processing for writing photographed image data in the memory 30 through the image sensing element 14, the A/D converter 16, the image processing circuit 20, and the memory control circuit 22, or from the A/D converter 16 directly through the memory control circuit 22, and development processing for reading out the image data written in the memory 30 using the memory control circuit 22 and optionally the image processing circuit 20 (step S1107). The details of the photography processing (step S1107) will be described later with reference to FIG. 7.

After the photography processing (step S1107) ends, the system control circuit 50 reads out the photographed image data written in the memory 30 and executes development processing, such as predetermined pixel interpolation processing or color conversion processing, using the memory control circuit 22 and optionally the image processing circuit 20. The developed image data is stored in a predetermined area of the memory 30 (step S1108), and the flow advances to step S1109.

The system control circuit 50 reads out the image data stored in the predetermined area of the memory 30 and executes image compression processing corresponding to the set mode using the compression/expansion circuit 32. After that, the system control circuit 50 stores the compressed image data in the predetermined area of the memory 30 (step S1109), and the flow advances to step S1110.

The system control circuit 50 reads out the compressed image data stored in the predetermined area of the memory 30 and executes predetermined encryption processing using the encryption/decryption circuit 34 (step S1110). After that, the system control circuit 50 stores the encrypted image data in the predetermined area of the memory 30, and the flow advances to step S1111.

(Distance Measurement/Photometry Processing)

The details of the distance measurement/photometry processing executed in step S1104 of FIG. 3 will be described with reference to the flowchart shown in FIG. 4.

It is determined first whether a distance measurement/photometry mode switching lever is currently set to speed priority distance measurement/photometry or normal priority distance measurement/photometry (step S1201). If the lever is set to normal priority distance measurement/photometry, normal priority distance measurement/photometry is executed (step S1206).

On the other hand, if the lever is set to speed priority distance measurement/photometry, it is determined whether the single shot/continuous shot/self timer switching button of the operation unit 70 is set to a self timer (step S1202). If YES in step S1202, the flow advances to step S1206 to execute normal priority distance measurement/photometry. If NO in step S1202, it is then determined whether the photography mode switching dial is set to the stitch photography mode (step S1203). If YES in step S1203, the flow advances to step S1206 to execute normal priority distance measurement/photometry.

If NO in step S1203, it is further determined whether the photography mode switching dial is set to the moving image photography mode (step S1204). If YES in step S1204, the flow advances to step S1206 to execute normal priority distance measurement/photometry.

If NO in step S1204, it is determined whether the macro button is set in the operation unit 70 (step S1205). If YES in step S1205, the flow advances to step S1206 to execute normal priority distance measurement/photometry.

If NO in step S1205, the flow advances to step S1208 to execute speed priority distance measurement/photometry.

After the normal priority distance measurement/photometry in step S1206 or the speed priority distance measurement/photometry in step S1208, the distance measurement/photometry processing ends.

(Normal Distance Measurement/Photometry Processing)

Figure 4:
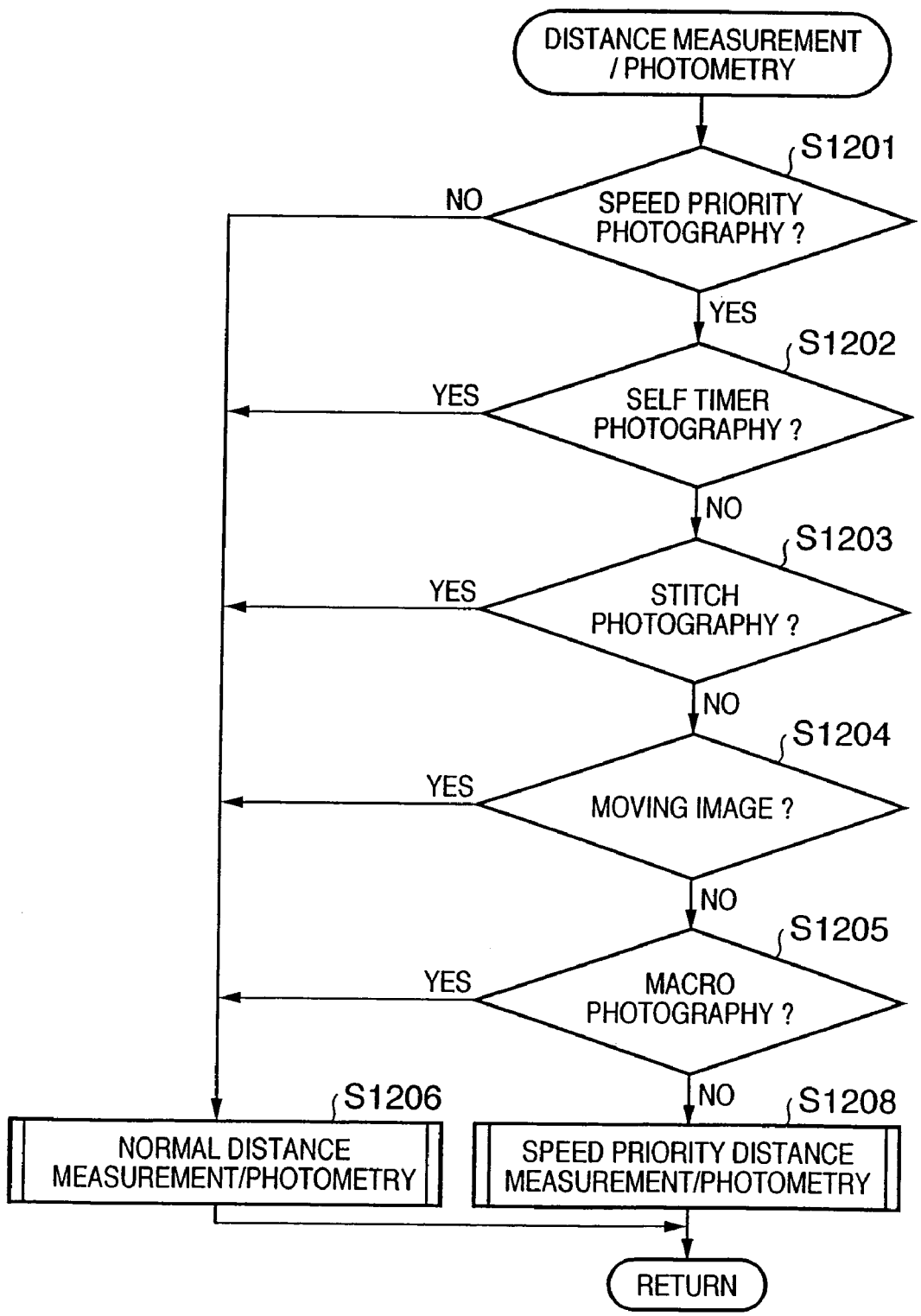
FIG. 4 is a flowchart showing in detail distance measurement/photometry processing in FIG. 3.
Figure 5:
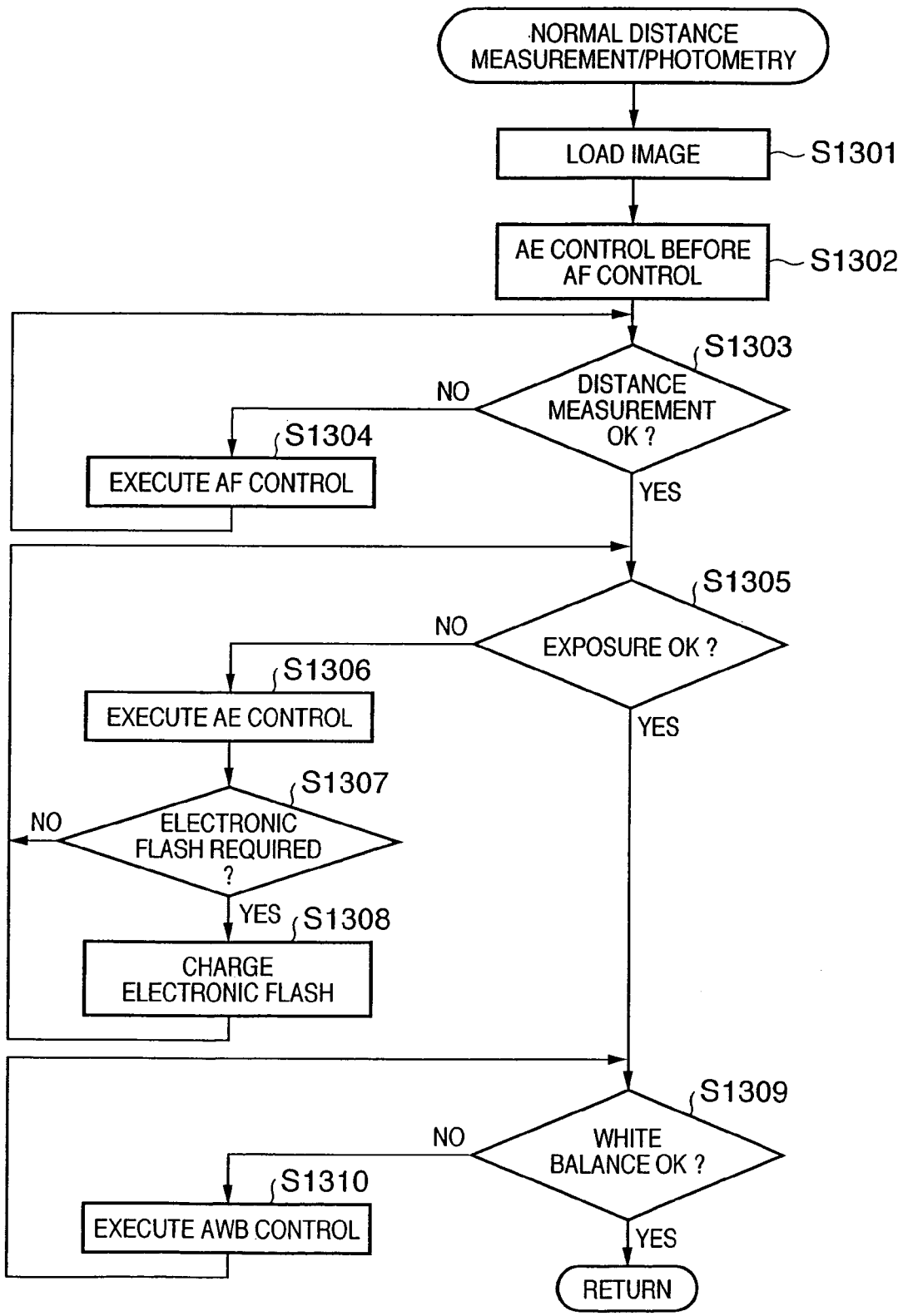
FIG. 5 is a flowchart showing in detail normal distance measurement/photometry processing in FIG. 4.

FIG. 5 is a flowchart showing the details of the normal distance measurement/photometry processing executed in step S1206 of FIG. 4.

The system control circuit 50 reads out a charge signal from the image sensing element 14 comprising, e.g., a CCD, and sequentially loads photographed image data to the image processing circuit 20 through the A/D converter 16 (step S1301). The image processing circuit 20 executes predetermined arithmetic processing to be used for AE (Auto Exposure) processing, EF (Electronic Flash pre emission) processing, and AF (Auto Focus) processing of TTL (Through The Lens) scheme by using the sequentially loaded image data.

In each processing, a necessary number of specific necessary parts are extracted from image data corresponding to all the photographed pixels and used for arithmetic processing. Accordingly, in each of the AE, EF, AWB, and AF processing of the TTL scheme, optimum arithmetic processing can be executed for each of different modes, such as a center weighted mode, an average mode, and an evaluation mode.

By using the arithmetic result by the image processing circuit 20, the system control circuit 50 executes exposure (AE) control necessary to the AF processing (step S1302). The system control circuit 50 causes the distance measurement unit 42 to execute AF control using the measurement data obtained in the AE control for AF processing until it is determined that the distance measurement (AF) attains focus (step S1303 to step S1304).

If it is determined that the distance measurement attains focus, the system control circuit 50 causes the exposure control unit 40 to execute AE control using the arithmetic result by the image processing circuit 20 until it is determined that the exposure (AE) is appropriate (step S1305 to step S1306). In addition, the system control circuit 50 determines by using the measurement data obtained by the AE control in step S1306 whether the electronic flash is necessary (step S1307). If YES in step S1307, a flash flag is set in, e.g., a predetermined area of the memory 52, and the electronic flash 48 is charged (step S1308).

If YES in step S1305, the measurement data and/or set parameters are stored in the internal memory of the system control circuit 50 or the memory 52.

By using the arithmetic result by the image processing circuit 20 and the measurement data obtained by the AE control, the system control circuit 50 causes the image processing circuit 20 to adjust parameters for color processing to execute AWB control until it is determined that the white balance (AWB) is appropriate (step S1309 to step S1310).

If YES in step S1309, the measurement data and/or set parameters are stored in the internal memory of the system control circuit 50 or the memory 52. The normal distance measurement/photometry processing ends.

(Speed Priority Distance Measurement/Photometry)

Figure 6:
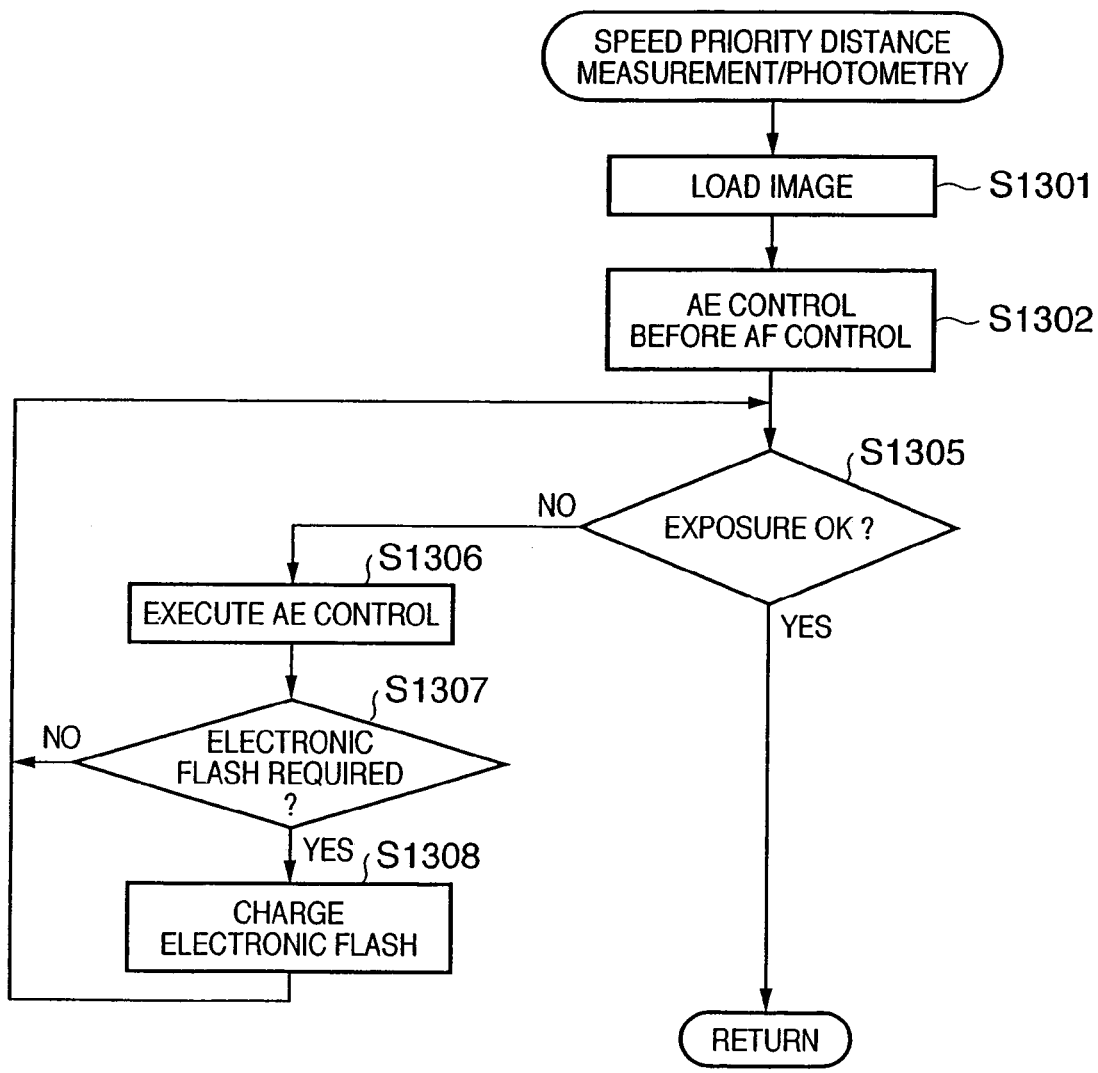
FIG. 6 is a flowchart showing in detail speed priority distance measurement/photometry processing in FIG. 4.

FIG. 6 is a flowchart showing the details of the speed priority distance measurement/photometry processing executed in step S1208 of FIG. 4. The same reference numerals in FIG. 6 denote the same processing steps as those in FIG. 5.

As can be seen from a comparison between FIG. 6 and FIG. 5, the speed priority distance measurement/photometry processing in this embodiment is obtained by omitting the AF control processing (steps S1303 and S1304) and AWB processing (steps S1309 and S1310) from the normal distance measurement/photometry processing. For this reason, the speed priority distance measurement/photometry processing takes a shorter processing time but is inferior to the normal distance measurement/photometry processing in focusing accuracy and color tone accuracy.

Since processing in the steps of FIG. 6 is the same as that in the steps of FIG. 5, a description of each step will be omitted.

In FIG. 6, if it is determined in step S1305 that the exposure (AE) is appropriate, the measurement data and/or set parameters are stored in the internal memory of the system control circuit 50 or the memory 52. The speed priority distance measurement/photometry processing ends.

(Photography Processing)

Figure 3:
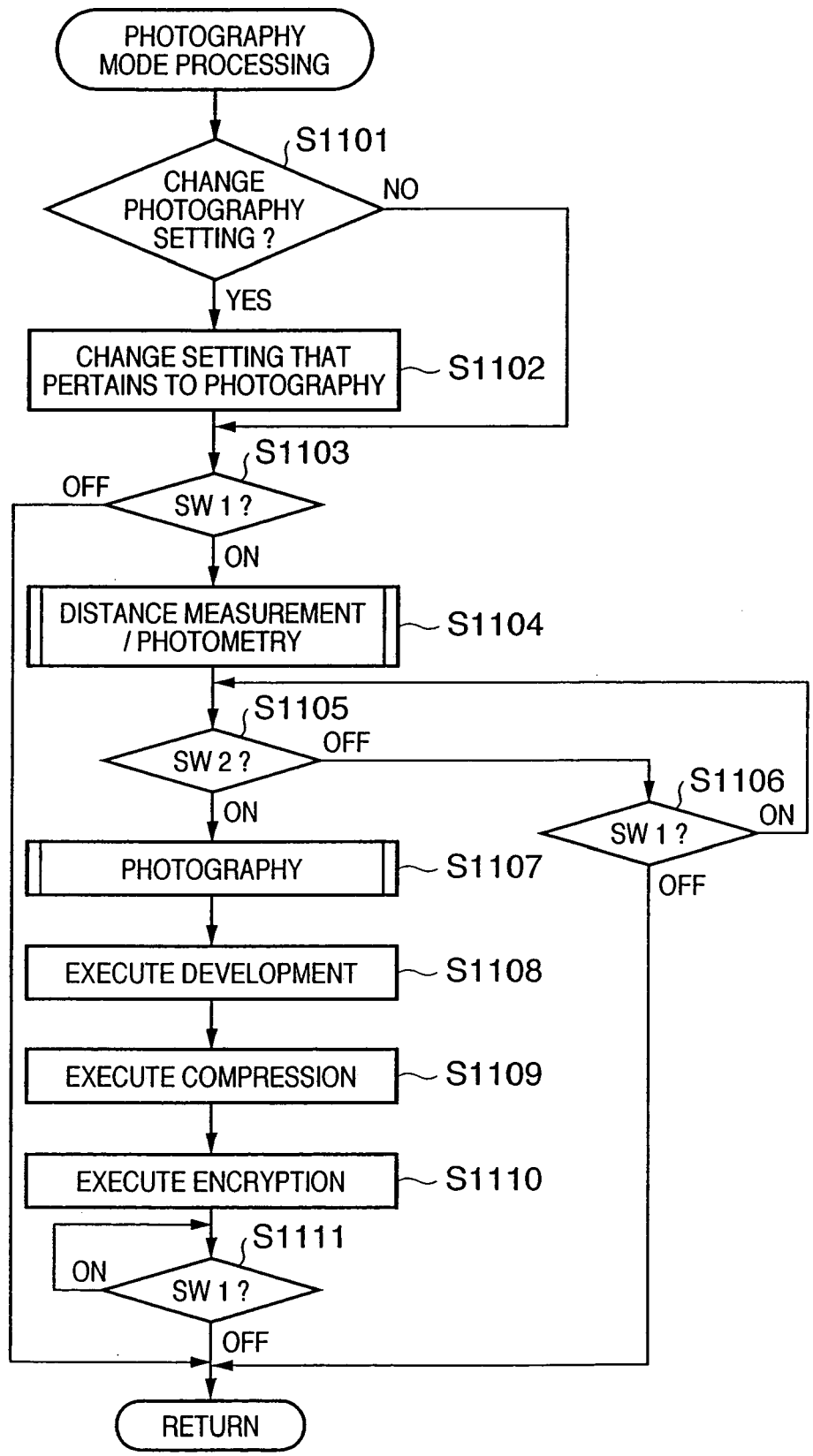
FIG. 3 is a flowchart showing in detail photography mode processing in FIG. 2.
Figure 7:
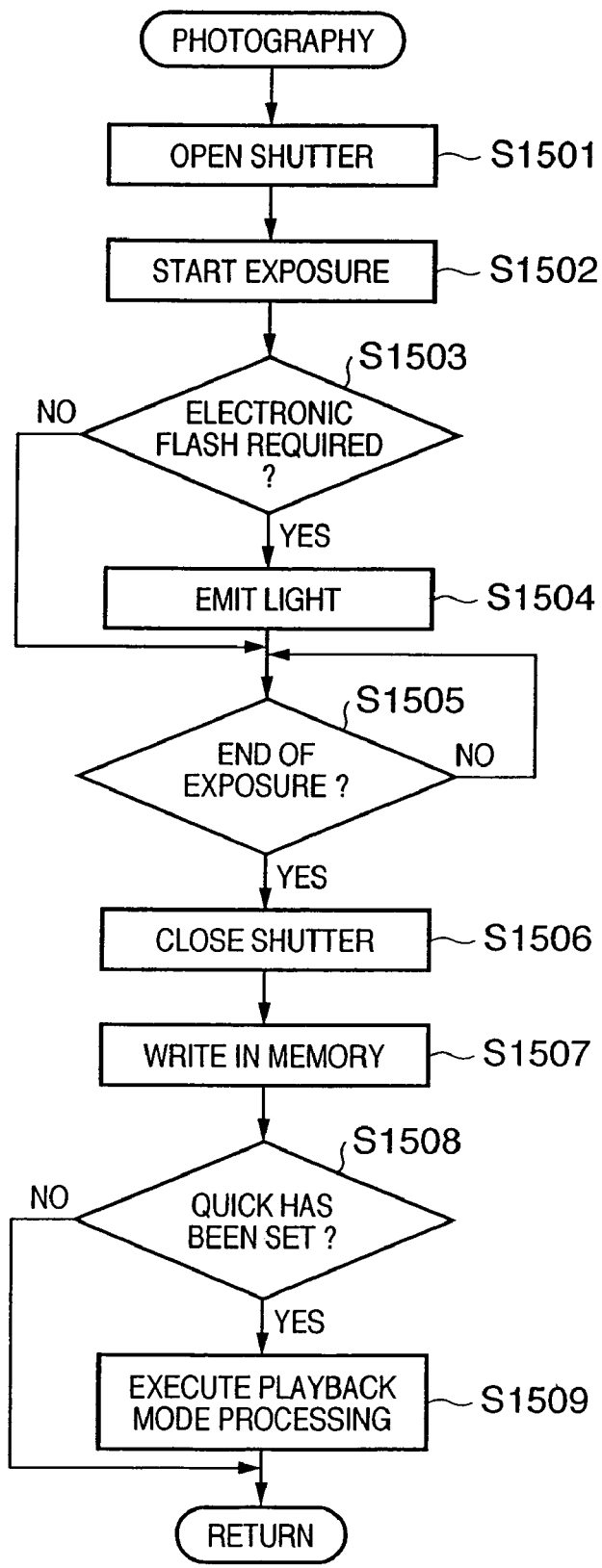
FIG. 7 is a flowchart showing in detail the photography processing in FIG. 3.

FIG. 7 is a flowchart showing the details of the photography processing executed in step S1107 of FIG. 3.

In accordance with photometry data stored in the internal memory of the system control circuit 50 or the memory 52, the system control circuit 50 causes the exposure control unit 40 to expose the image sensing element 14 by opening the shutter 12 having a stop function in accordance with the F number (steps S1501 and S1502).

Then, the predetermined area of the memory 52 is referred to, and it is checked whether the flash flag is set (step S1503). If YES in step S1503, the electronic flash is caused to emit light (step S1504).

The system control circuit 50 waits for the end of exposure of the image sensing element 14 in accordance with the photometry data (step S1505). The shutter 12 is closed (step S1506), and a charge signal is read out from the image sensing element 14. The data of a photographed image is written in the memory 30 through the A/D converter 16, the image processing circuit 20, and the memory control circuit 22, or directly from the A/D converter 16 through the memory control circuit 22 (step S1507).

It is determined whether the quick review function is set (step S1508). If YES in step S1508, the playback mode processing is executed to display the photographed image on the indicator unit 54 (step S1509).

After the series of processing operations, the photography processing ends.

As described above, according to this embodiment, if the photography setting is so made as to put a higher priority on speed, self timer photography, which does not require immediacy, stitch photography, or macro photography, which cannot easily be executed without priority on precision automatically complies with the normal (in other word, speed priority) photography setting. This enables immediate photography if the user wishes to execute speed priority photography, and enables precise photography if the user wishes to execute another type of photography, without making the user become conscious.

Other Embodiment

The above mentioned embodiment has described a case wherein only self timer photography, stitch photography, moving image photography, and macro photography are used as photography modes of automatically complying with the precision priority photography setting (normal distance measurement/photometry processing setting) when the speed priority photography setting (speed priority distance measurement/photometry processing setting) is selected. Any number of photography modes which should put a higher priority on precision or need not put a higher priority on speed can be applied. Examples of applicable photography modes other than the above mentioned ones include interval photography, 3D photography, and the like.

The above-mentioned embodiment also has described a case wherein a higher priority is put on precision in a specific photography mode when the speed priority photography setting is selected. It is also possible to put a higher priority on speed in a specific photography mode when the precision priority photography setting is selected. In this case, it is determined in step S1201 of FIG. 4 whether a higher priority is put on precision. It is then determined in steps S1202 to S1205 whether the current photography mode should put a higher priority on precision. Steps S1206 and S1208 are interchanged. Examples of speed priority photography modes include a continuous shooting mode, a sports photography mode, and the like.

Prohibition of a specific photography mode setting or photography in the specific photography mode when the speed priority photography setting is selected and prohibition of a specific photography mode setting or photography in the specific photography mode when the precision priority photography setting is selected can easily be implemented.

The present invention includes a case wherein the equivalent functions are achieved by supplying a software program that implements the functions of the aforementioned embodiment directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as long as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiment may be implemented not only by executing the readout program code by the computer but also by some or all of actual processing operations executed by an OS or the like running on the computer on the basis of an instruction of that program.

Furthermore, the functions of the aforementioned embodiment may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-346961 filed on Oct. 6, 2003, which is hereby incorporated by reference herein.

What is claimed is:

1. An image sensing apparatus comprising:
   a) a photography mode setting unit that sets one of a plurality of photographing modes of the image sensing apparatus based on a user's operation, wherein the plurality of photographing modes includes at least one of a self timer photography mode, a stitch photography mode, a moving image photography mode, a macro photography mode, an interval photography mode, and a 3D photography mode;
   b) a processing mode setting unit that allows a user to set one of a first processing mode of executing speed priority photography processing and a second processing mode of executing precision priority photography processing, wherein the processing mode and the photographic mode are settable independently and combinations of the first processing mode and one of the self timer photography mode, the stitch photography mode, the moving image photography mode, the macro photography mode, the interval photography mode, and the 3D photography mode are inappropriate combinations; and
   c) a control unit that performs, in response to an operation of a release button by the user, one of the first processing mode and the second processing mode of photography processing based on the settings set by the user via said processing mode setting unit and the settings set by said photography mode setting unit,
   wherein in response to an operation of the release button by the user during the first processing mode that has been set by said processing mode setting unit, said control unit determines if one of the self timer photography mode, the stitch photography mode, the moving image photography mode, the macro photography mode, the interval photography mode, and the 3D photography mode has been set by said photography mode setting unit,
   wherein if the first processing mode has been set by said processing mode setting unit and said control unit determines that one of the self timer photography mode, the stitch photography mode, the moving image photography mode, the macro photography mode, the interval photography mode, and the 3D photography mode has been set by said photography mode setting unit, said control unit changes the processing mode from the first processing mode to the second processing mode and performs the second processing mode of photography processing, and
   wherein if said control unit determines that none of the self timer photography mode, the stitch photography mode, the moving image photography mode, the macro photography mode, the interval photography mode, and the 3D photography mode has been set by said photography mode setting unit, said control unit performs the first processing mode of photography processing.

2. An image sensing apparatus according to claim 1, wherein the second processing mode of the photography processing includes at least AF (Auto Focus) processing, AE (Auto Exposure) processing, and AWB (Auto White Balance) processing and the first processing mode of the photography processing includes the same processing as in the second processing mode except for lacking of the AF processing and AWB processing.

3. An image sensing apparatus according to claim 1, wherein said photography mode setting unit can set one of the self timer photography mode, the stitch photography mode, the moving image photography mode, the macro photography mode, the interval photography mode, and the 3D photography mode even if the first processing mode has been set by said processing mode setting unit, and
wherein said processing mode setting unit can set the first processing mode even if one of the self timer photography mode, the stitch photography mode, the moving image photography mode, the macro photography mode, the interval photography mode, and the 3D photography mode has been set by said photography mode setting unit.

* * * * *